United States Patent [19]

Caldwell

[11] Patent Number: 5,199,214
[45] Date of Patent: Apr. 6, 1993

[54] TREE STAKING SYSTEM, PARTS THEREFOR AND METHODS OF MAKING THE SAME

[75] Inventor: Edward N. Caldwell, Knoxville, Tenn.

[73] Assignee: Dalen Products, Inc., Knoxville, Tenn.

[21] Appl. No.: 924,143

[22] Filed: Aug. 3, 1992

[51] Int. Cl.⁵ ............................................. A01G 31/00
[52] U.S. Cl. ........................................ 47/42; 135/118
[58] Field of Search ................... 47/42, 43; 135/118

[56] References Cited

U.S. PATENT DOCUMENTS

| | | | |
|---|---|---|---|
| 473,412 | 4/1892 | Barker | 47/43 |
| 690,102 | 12/1901 | Drummer, Jr. | 135/118 |
| 1,105,884 | 8/1914 | Crites | 135/118 |
| 3,788,336 | 1/1974 | Steffes | 135/118 |
| 4,063,567 | 12/1977 | Martin et al. | 135/118 |
| 4,319,428 | 3/1982 | Fox | 47/42 |
| 4,870,781 | 10/1989 | Jones | 47/43 |
| 4,953,576 | 9/1990 | Connelly | 135/118 |
| 4,967,506 | 11/1990 | Lawson | 47/44 |

Primary Examiner—David A. Scherbel
Assistant Examiner—Joanne C. Downs
Attorney, Agent, or Firm—Candor, Candor & Tassone

[57] ABSTRACT

A tree staking system, parts therefor and methods of making the same are provided, the stake comprising a piece of material having an upper end adapted to be operatively associated with an end of a support rope that is to be interconnected to the tree that is planted in the ground, the piece of material having a lower end adapted to be driven into the ground in spaced relation to the tree by hammering or the like on the upper end thereof, the stake having a pair of opposed sides and a centerline extending between the upper end and the lower end thereof, the stake having a substantially straight hole therein and leading from the upper end at an angle to the centerline, the hole having an upper end that interrupts the upper end adjacent one of the opposed sides thereof whereby the hole is adapted to receive a substantially straight shank portion of an anchor pin through the upper end thereof until an attaching end of the pin for the end of the rope abuts the upper end of the stake adjacent the upper end of the hole.

18 Claims, 1 Drawing Sheet

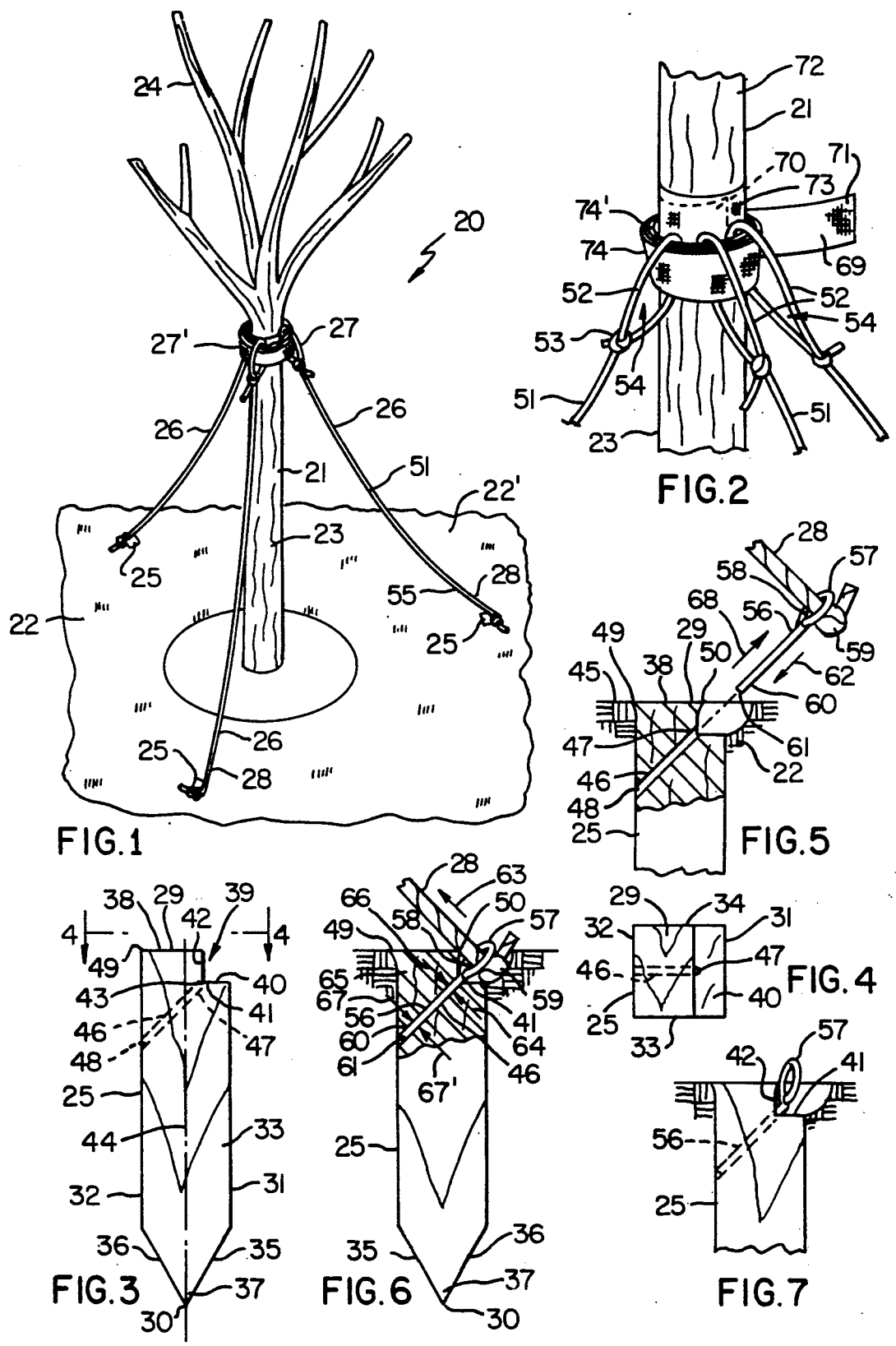

TREE STAKING SYSTEM, PARTS THEREFOR AND METHODS OF MAKING THE SAME

BACKGROUND OF THE INVENTION

1. Field of the Invention

This invention relates to a new staking system for a tree or the like and to a new stake for such a system or the like as well as to new methods of making such a system and such a stake.

2. Prior Art Statement

It is known to provide a stake for a tree or the like comprising a piece of material having an upper end means adapted to be operatively associated with an end of a support rope or the like that is to be interconnected to the tree that is planted in the ground or the like, the piece of material having a lower end means adapted to be driven into the ground in spaced relation to the tree by hammering or the like on the upper end means thereof, the stake having a pair of opposed side means and a centerline extending between the upper end means and the lower end means thereof.

It is also known to provide a staking system for a tree or the like comprising a tree or the like planted in the ground or the like, a plurality of stakes driven into the ground in a generally circular array about the tree, and a plurality of rope means respectively having upper end means attached to the tree and lower end means attached to the stakes, each stake comprising a piece of material having an upper end means interconnected with the lower end means of its respective rope means and having a lower end means driven into the ground by hammering or the like on the upper end means thereof, each stake having a pair of opposed side means and a centerline extending between the upper end means thereof and the lower end means thereof. For example, see the prior art structure illustrated in FIG. 1 of the U.S. Pat. No. 4,967,506 to Lawson.

SUMMARY OF THE INVENTION

It is a feature of this invention to provide a tree staking system which allows the stakes thereof to be driven substantially flush with the ground and which allows the ropes extending between the tree and the stakes to be easily removed from the stakes so as to leave substantially no projections above ground level to interfere with subsequent grass mowing, etc., such ropes to thereafter be easily reattached to their respective stakes for their tree supporting function.

In particular, see the aforementioned U.S. Pat. No. 4,967,506 to Lawson, which illustrates in FIG. 1 thereof the problem with the prior known tree staking systems whereby this U.S. patent is being incorporated into this disclosure by this reference thereto.

The aforementioned U.S. Pat. No. 4,967,506, to Lawson, provides one solution to such problem by utilizing J-shaped metallic anchor pins that are driven into the ground as well as a flat washer arrangement for each anchor pin.

In contrast, applicant has found that a tree stake can be formed from a simple piece of material, such as wood or the like, and can be uniquely formed with a straight hole that is angled so as to permit an anchor pin for its respective rope means to be inserted therein for tree supporting purposes and then can be easily removed therefrom to permit subsequent grass mowing and the like over the stake that has been driven in the ground so as to be substantially flush with the ground.

For example, one embodiment of this invention comprises a stake for a tree or the like comprising a piece of material having an upper end means adapted to be operatively associated with an end of a support rope or the like that is to be interconnected to the tree that is planted in the ground or the like, the piece of material having a lower end means adapted to be driven into the ground in spaced relation to the tree by hammering or the like on the upper end means thereof, the stake having a pair of opposed side means and a centerline extending between the upper end means and the lower end means thereof, the stake having a substantially straight hole therein and leading from the upper end means at an angle to the centerline, the hole having an upper end that interrupts the upper end means adjacent one of the opposed side means whereby the hole is adapted to receive a substantially straight shank portion of an anchor pin through the upper end thereof until an attaching end of the pin for the end of the rope abuts the upper end means of the stake adjacent the upper end of the hole.

Another embodiment of this invention comprises a staking system for a tree or the like comprising a tree or the like planted in the ground or the like, a plurality of stakes driven into the ground in a generally circular array about the tree, and a plurality of rope means respectively having upper end means attached to the tree and lower end means attached to the stakes, each stake comprising a piece of material having an upper end means interconnected to the lower end means of its respective rope means and having a lower end means driven into the ground by hammering or the like on the upper end means thereof, each stake having a pair of opposed side means and a centerline extending between the upper end means thereof and the lower end means thereof, each stake having a substantially straight hole therein and leading from the upper end means thereof at an angle to the centerline thereof, each rope means comprising a rope or the like having a lower end and an anchor pin having an attaching end attached to the lower end of its respective rope and having a substantially straight shank portion, each hole having an upper end that interrupts the upper end means of its respective stake adjacent one of the opposed side means thereof and receiving the shank portion of its respective anchor pin therein until the attaching end abuts the upper end means of its respective stake adjacent the upper end of the hole.

It is another feature of this invention to provide a new tree staking system wherein unique means are provided for attaching the respective support rope to the trunk of the tree or the like.

In particular, it is known that it is desired to provide a staking system wherein the tree is allowed to sway in the wind but be supported from excess bending thereof.

However, in one prior known staking system, it has been found that woven fabric straps provide constant tension around the trunk of the tree if limbs are not available to hold the straps from slipping down the tree trunk when loosely disposed around the same.

Therefore, it has been found, according to the teachings of this invention that a collar means can be formed from a strip of flexible material that can be loosely disposed about the trunk of a tree and be interconnected to the upper ends of the support ropes that can normally remain in a slack condition between the trunk of the tree and their respective stakes to permit normal swaying of the tree.

For example, another embodiment of this invention comprises a staking system for a tree or the like comprising a tree or the like planted in the ground or the like, a plurality of stakes driven into the ground in a generally circular array about the tree, a plurality of rope means respectively having upper end means attached to the tree and lower end means attached to the stakes, each stake comprising a piece of material having an upper end means interconnected with the lower end means of its respective rope means and having a lower end means driven into the ground by hammering or the like on the upper end means thereof, each stake having a pair of opposed side means and a centerline extending between the upper end means thereof and the lower end means thereof, each rope means comprising a rope or the like having a lower end attached to the upper end means of its respective stake and having an upper end attached to the tree, each rope having the upper end thereof looped so as to define an opening therethrough, and means attaching the upper ends of the ropes to the tree, the means attaching the upper ends of the ropes to the tree comprising a tree collar means that is carried by the tree and extends through the openings of the upper ends of the ropes, the tree collar comprising a strip of flexible material that is wrapped about the trunk of the tree, the strip of material having one or more turns loosely wrapped about the trunk of the tree before being passed through the openings of the ropes to form a plurality of further loose wraps about the trunk of the tree.

Accordingly, it is an object of this invention to provide a new stake for a tree or the like, the new stake of this invention having one or more of the novel features of this invention as set forth above or hereinafter shown or described.

Another object of this invention is to provide a new method of making such a stake, the method of this invention having one or more of the novel features of this invention as set forth above or hereinafter shown or described.

Another object of this invention is to provide a new staking system for a tree or the like, the system of this invention having one or more of the novel features of this invention as set forth above or hereinafter shown or described.

Another object of this invention is to provide a new method of making such a staking system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view illustrating the new tree staking system of this invention utilizing the new tree trunk collar means of this invention and the new stakes of this invention.

FIG. 2 is an enlarged fragmentary perspective view of the collar means of this invention together with the support ropes disposed in one of the assembling positions thereof.

FIG. 3 is a side view of the new stake of this invention.

FIG. 4 is a top view of the stake of FIG. 3 and is taken in the direction of the arrows 4—4 of FIG. 3.

FIG. 5 is a fragmentary view, partially in cross section, illustrating the stake of FIG. 3 driven into the ground and illustrating by a fragmentary exploded perspective view how the rope means for the stake can be readily attached thereto and readily removed therefrom.

FIG. 6 is a view similar to FIG. 5 and illustrates the rope means for the stake of FIG. 5 in its assembled relation with the stake.

FIG. 7 is a view similar to FIG. 6 and illustrates how the anchor pin of the rope means for the stake can be bent at the attaching end thereof, FIG. 7 illustrating the anchor pin without its rope being attached thereto.

DESCRIPTION OF THE PREFERRED EMBODIMENTS

While the various features of this invention are hereinafter illustrated and described as being particularly adapted to provide a staking means for a tree that is planted in the ground, it is to be understood that the various features of this invention can be utilized singly or in various combinations thereof to provide a staking means for other plants, structure, etc. as desired.

Therefore, this invention is not to be limited to only the embodiments illustrated in the drawings, because the drawings are merely utilized to illustrate one of the wide variety of uses of this invention.

Referring now to FIG. 1, the new staking system of this invention is generally indicated by the reference numeral 20 and comprises a tree 21 planted in the ground 22 so that a tree trunk 23 thereof extends above the ground 22 and has a plurality of limbs 24 that are spaced from the ground 22 a distance that normally does not readily permit the attaching of stake support ropes thereto.

The staking system 20 of this invention also comprises a plurality of unique stakes 25 of this invention driven into the ground 22 in a generally circular array about the tree trunk 23 and a plurality of rope means 26 respectively having upper ends 27 attached to the tree 21 by a unique collar means 27' of this invention and lower end means 28 attached to the stakes 25 in a manner hereinafter set forth whereby the rope means 26 are normally in a slack condition as illustrated in FIG. 1 to permit the tree 21 to normally sway without restraint thereof but providing full support for the tree 21 from excess bending thereof for the reasons that are well known in the tree staking art.

For example, it is believed that a tree must be allowed to sway in the wind for trunk cells to develop properly so that flexibility and strength for the tree are achieved.

Each stake 25 of this invention is formed from a piece of material, such as wood, plastic, compressed material etc., and has an upper end means 29 and a lower end means 30 as well as a first pair of opposed substantially flat parallel side means 31 and 32 and a second pair of opposed substantially flat parallel side means 33 and 34 that extend between the side means 31 and 32.

The end means 30 of the stake 25 is defined by sections 35 and 36 of the side means 31 and 32 angling toward each other to define a generally pointed area 37 that facilitates the driving of the stake 25 substantially vertically into the ground 22 by hammering or the like on the upper end means 29 thereof.

The upper end means 29 of the stake 25 has a substantially flat top surface section 38 and a notched corner means 39 that defines a notched surface means 40 that comprises two substantially flat surfaces 41 and 42 that are disposed at substantially right angles relative to each other and are joined together at a juncture line 43, the flat surface 42 defining a shoulder as will be apparent hereinafter and joining the flat top surface 38 at substantially a right angle relative thereto.

While the distance between the opposed side means 31 and 32 can be any desired distance, it is believed that the notched corner means 39 need not extend beyond a centerline 44 of the stake 25 so that there will be sufficient area on the flat surface 38 for hammering against in order to drive the stake 25 substantially vertically into the ground in the manner illustrated in FIG. 5 so that the upper end surface means 29 thereof is generally flush with the top surface 45 of the ground 22 for a purpose hereinafter set forth.

Thus, it can be seen that the surfaces 38, 42 and 41 of the stake 25 define the top surface means of the upper end means 29 of the stake 25.

A substantially straight hole 46 is formed in the stake 25, such as by drilling into the stake 25, the hole 46 leading from the upper end means 29 at an angle to the centerline 44 so that an upper end 47 of the hole 46 interrupts the upper end means 29 of the stake 25 adjacent the side means 31 thereof.

In fact, the upper end 47 of the hole 46 is disposed at the juncture line 43 between the surfaces 41 and 42 of the end means 29 and has a lower end 48 that interrupts the other opposed side means 32 so as to provide for drainage through the hole 46 to prevent the accumulation of rain or the like in the hole 46 that would tend to rot the material of the stake 25 should the stake 25 be formed of a material that would be adversely affected by such a stored liquid.

As illustrated in FIG. 4, the hole 46 passes substantially through the middle portion of the stake 25 so as to be substantially medially disposed between the opposed flat side means 33 and 34 thereof.

While the hole 46 could be formed in a stake 25 that did not have the notched area 39 so as to extend from a true corner thereof, such as the corner 49 illustrated in FIG. 3, it has been found that by locating the upper end 47 of the hole 46 at the notched area 39 removes the same from the edge means 49 and 50 of the flat surface 38 against which a hammer or the like is impacted to drive the stake 25 into the ground as such hammering causes a feathering over of the corner areas 49 and 50 as illustrated in FIGS. 5, 6 and 7 that might adversely affect the opening size of the upper end 47 of the hole 46 so as to prevent its intended use in a manner hereinafter set forth.

Each rope means 26 of the staking system 20 of this invention comprises a rope 51 having an upper end 52 that is tied into a loop arrangement by a knot 53 so as to define an opening 54 passing therethrough for a purpose hereinafter described.

The other or lower end 55 of each rope 51 has an anchor pin 56 attached thereto, each anchor pin 56 being formed of metal having an attaching end 57 which is itself looped to define an opening 58 therethrough and through which the end 55 of the rope 51 passes and is then tied in an enlarged knot 59 which cannot then be pulled out through the opening 58 of its respective anchor pin 56.

Each anchor pin 56 has a substantially straight shank portion 60 extending from the attaching end 57 thereof and being of a size so that the same is adapted to be loosely received in a hole 46 of a stake 25 in the manner illustrated in FIG. 5 by inserting the free end 61 of the shank portion 60 thereof into the upper end 47 of the hole 46 as indicated by the arrow 62 in FIG. 5 and then inserting the shank 60 downwardly into the hole 46 until the attaching end 57 thereof abuts the notched surface means 41 in the manner illustrated in FIG. 6.

In this manner, any subsequent outwardly pulling force on the rope 51 in the direction of the arrow 63 in FIG. 6, such as through an excess swaying of the tree 21, will not cause the anchor pin 56 to be removed from the hole 46 as the upward movement of the upper part of the shank portion 60 of the anchor pin 56 in the direction of the arrow 64 in FIG. 6 is resisted by the upper corner portion 65 of the stake 25 as represented by the arrow 66 in FIG. 6 and the downward movement of the lower part of the shank portion 60 in the direction of the arrow 67 in FIG. 6 is resisted by the lower portion of the stake as represented by the arrow 67' in FIG. 6 whereby the hole 46 and anchor pin 56 for its respective rope 51 firmly attaches the lower end means 28 of the rope means 26 to the stake 25 of this invention for its tree supporting function.

However, when it is desired to cut the grass 22' that is growing out of the surface 45 of the ground 22 adjacent the tree 21, each rope means 26 can be easily disconnected from its respective stake 25 by merely pulling outwardly on each anchor pin 56 in the direction of the arrow 68 in FIG. 5 so that all that remains of the staking system 20 at ground level are the upper end means 29 of the stakes 25 that are disposed substantially flush with the surface 45 of the ground 22 so as to permit easy mowing thereover when desired, the lower ends 28 of the rope means 26 merely being looped over one or more of the limbs 24 to hold the same out of the way during such mowing.

Thereafter, the lower end 28 of each rope means 26 can be attached to its respective stake 25 by merely inserting the shank portion 60 of its anchor pin 56 into the hole 46 in the direction of the arrow 62 of FIG. 5 as previously described.

Should a force on a particular rope means 26 occur in the direction of the arrow 63 of FIG. 6 be excessive so as to tend to bend the respective anchor pin 56 at the attaching end 57 thereof in the manner illustrated in FIG. 7, the large surface area 42 of the notched surface means 41 acts as a shoulder against which the attaching end 57 of the anchor pin 56 can abut as illustrated in FIG. 7 to prevent further excess bending thereof and the same will not damage the material of the stake 25 as a large section of stake 25 is opposing further bending of the attaching end 57 as illustrated in FIG. 7.

Therefore, it can be seen that it is a relatively simple method of this invention to form a stake 25 by merely shaping the same in the manner illustrated in FIG. 3, notching the corner means 39 and then drilling the hole 46 to permit the resulting stake 25 to function in the system 20 in the manner previously set forth.

However, it can be seen that because the stake 25 of this invention is driven completely into the ground 22 so as to have the upper end surface 38 thereof disposed substantially flush with the top surface 45 of the ground 22, the stake 25 need not be made as long as a conventional stake that has an upper end protruding above the ground whereby the savings in the material for the stakes 25 of this invention can be utilized to pay for the wire forms or pins 56.

The ropes 51 of the rope means 26 of this invention can be formed of any suitable material, such as from natural or synthetic fibers, plastic, etc., and the ropes 51 can be sold together with the anchor pins 56, stakes 25 and collar means 27' in a single package for a user who will subsequently stake a tree 21 in the manner previously set forth.

The ropes 51 in such kit could have the upper ends 52 thereof previously formed so that the user would provide the knots 59 with the anchor pins 56 when desiring to use such tree staking kit to stake a particular tree. However, it is to be understood that the rope could be supplied in a single length from which the individual ropes 51 can be cut to the desired length.

In any event, the collar means 27' of this invention comprises a strip 69 of flexible material, such as a nonwoven or woven fabric material of natural or synthetic fibers, or solid strip material as desired. The strip 69 has opposed ends 70 and 71 and can be applied to the tree trunk 23 at a point above or below the limbs 24 as desired as the material of the strip 69 when engaging against the bark 72 of the tree trunk 23 will frictionally hold to the same even though the strip of material 69 is wrapped loosely against the tree trunk 23.

Thus, it can be seen that when forming the collar 27' of this invention, the end 70 is first disposed against the tree trunk 23 and then at least one turn or wrap 73 is made with the strip 69 so as to overlap the end 70 thereof as illustrated in FIG. 2 and then by holding all of the looped ends 52 of the ropes 51 together, the strip 69 is threaded through the openings 54 thereof in a serial manner to produce a number of additional loose turns or wraps 74 as illustrated in FIG. 2 with the inner wrap or turn 74' thereof being slightly loosely spaced from the inner wrap 73 so as to subsequently permit the looped ends 52 of the ropes 51 to be positioned around the collar 27' as illustrated in FIG. 1. When the strip 69 has been continuously looped to provide the wraps 74 through the openings 54 of the looped ends 52 of the ropes 51, the remaining outer end 71 is then ducked under between the wraps 73 and 74' to complete the collar 27' and thus attach the upper ends 27 of the rope means 26 to the tree 21.

It is found that there is virtually no tension provided by such collar 27' against the bark 72 of the tree 21 since the very light nonwoven material of the strip 69 clings tenaciously to the bark 72 even with the slightest pressure. Since the ropes 51 in the system 20 of this invention are normally in a slack condition between the stakes 25 and the collar 27', the tree 21 is able to flex in the wind until the slack is taken up and then the looped ends 52 of the ropes 51 pull against the multiple wraps 74 of the material 69 restraining the tree 21 against further motion thereof. When the wind abates, the whole system 20 is slack again so that virtually no force is exerted on the tree 21 except when needed to resist the wind.

The use of multiple turns of the very lightweight material of the strip 69 makes possible very high frictional engagement of the material of the strip 69 with the trunk 23 of the tree 21 with very little tightness and this contrasts with the necessity of pulling a single strong strap very tight in order to develop the necessary friction to keep the collar up as in a prior known staking arrangement. This allows the loose or slack condition of the ropes 51 whereas in the prior known system, tension is required by the rope on a single strap to maintain tightness.

Of course, as the size of the tree trunk 23 increases in diameter through growth thereof, the strip 69 can be unwound from the tree 21 and then reutilized to form a new collar means 27' in the manner previously set forth except that the same now has the turns 73 and 74 thereof adapted to be in a loose manner about the new size of the tree trunk 23.

Therefore, it can be seen that it is a relatively simple method of this invention to make the collar means 27' thereof by loosely wrapping the strip 69 of material about the trunk 23 of the tree 21 in the manner previously described.

As previously stated, the strip 69 of material can be any suitable material and in one working embodiment of this invention the strip 69 comprises a nonwoven polypropylene fabric that is approximately 1 and ¼ inches wide and approximately 36 inches long, the polypropylene fabric comprising material that weighs approximately 1 and ¼ ounces per square yard of material and having an approximately 40 pound breaking strength per wrap thereof whereby five wraps resist approximately 200 pounds and ten wraps oppose approximately 400 pounds. Such a strip 69 of material can be initially wrapped around the trunk 23 of the tree 1 and ¼ to 2 and ¼ times before being threaded through the openings 54 of the ends 52 of the ropes 51 and will be looped therethrough approximately 6 to 10 times before needing to tuck in the end 71 of the strip 69 as previously set forth.

While the stakes 25 can be formed of any suitable material and have any suitable dimensions, one working embodiment thereof comprises a piece of hard wood, such as oak, that has approximately 1 inch wide side means 31 and 32, approximately 1 inch wide side means 33 and 34 with an overall length along the center line 44 of approximately 12 inches. The notched area 39 is approximately ⅜ of an inch by approximately ¼ 25 of an inch, the shoulder or surface 42 being the ⅜ of an inch surface. The hole 46 has a diameter of approximately 0.156 of an inch while the diameter of the shank portion 60 of the pin 56 is approximately 0.148 of an inch. The attaching end 57 of each anchor pin 56 defines an opening 58 with a diameter of approximately 0.265 of an inch, each anchor pin 56 having a length from the center of the opening 59 thereof to the free end 61 thereof of approximately 1 and ¼ inches. The hole 46 of each stake makes an angle of approximately 45 degrees with the centerline 44 of the stake 25.

The ropes 51 of course have a diameter which would permit the same to be threaded through the openings 58 of the pins 56 and generally should have a length of between 4 feet and 12 feet depending upon the size of the tree 21 to be staked.

The roping material 51 could be supplied in one continuous length in the aforementioned kit so as to be cut into the individual lengths as desired and while only three ropes 51 are illustrated in the system 20, it is to be understood that the system 20 could utilize more than three ropes 51 and three stakes 25 if desired.

Of course, the above dimensions for the stakes 25, collar 27' and rope means 26 are merely examples of one working embodiment thereof and are not to be a limitation on the claims of this invention as any desired dimensions can be utilized.

Therefore, it can be seen that it is a relatively simple method of this invention to make the staking system 20 of this invention utilizing the stakes 25 and collar means 27' formed in the manner previously set forth.

Thus, this invention not only provides a new tree staking system and method of making the same, but also this invention provides a new stake and a new collar means for such a system or other systems as desired as well as new methods of making such stakes and such collar means.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a stake for a tree comprising a piece of material having an upper end means adapted to be operatively associated with an end of a support rope that is to be interconnected to said tree that is planted in the ground, said piece of material having a lower end means adapted to be driven into said ground in spaced relation to said tree by hammering on said upper end means thereof, said stake having a pair of opposed side means and a centerline extending between said upper end means and said lower end means, the improvement wherein said stake has a substantially straight hole therein and leading from said upper end means at an angle to said centerline, said hole having an upper end that interrupts said upper end means adjacent one of said opposed side means whereby said hole is adapted to receive a substantially straight shank portion of an anchor pin through said upper end thereof until an attaching end of said pin for said end of said rope abuts said upper end means of said stake adjacent said upper end of said hole.

2. A stake as set forth in claim 1 wherein said lower end of said hole interrupts the other of said opposed side means.

3. A stake as set forth in claim 1 wherein said upper end means of said stake has a notched corner means at said one of said opposed side means that defines a notched surface means, said upper end of said hole interrupting said notched surface means.

4. A stake as set forth in claim 3 wherein said notched surface means defines a shoulder against which said attaching end of said pin can abut.

5. A stake as set forth in claim 4 wherein said notched surface means defines two substantially flat surfaces that are angled relative to each other and join together at a juncture line, one of said flat surfaces comprising said shoulder, said upper end of said hole interrupting said notched surface means at said juncture line thereof.

6. In a staking system for a tree comprising a tree or the like planted in the ground, a plurality of stakes driven into said ground in a generally circular array about said tree, and a plurality of rope means respectively having upper end means attached to said tree and lower end means attached to said stakes, each said stake comprising a piece of material having an upper end means interconnected with said lower end means of its respective rope means and having a lower end means driven into said ground by hammering on said upper end means thereof, each said stake having a pair of opposed side means and a centerline extending between said upper end means thereof and said lower end means thereof, the improvement wherein each said stake has a substantially straight hole therein and leading from said upper end means thereof at an angle to said centerline thereof, each said rope means comprising a rope having a lower end and an anchor pin having an attaching end attached to said lower end of its respective rope and having a substantially straight shank portion, each said hole having an upper end that interrupts said upper end means of its respective stake adjacent one of said opposed side means thereof and receiving said shank portion of its respective anchor pin therein until said attaching end abuts said upper end means of its respective stake adjacent said upper end of said hole.

7. A system as set forth in claim 6 wherein each said stake has been driven into said ground until said upper end means thereof is substantially flush with said ground.

8. A system as set forth in claim 6 wherein said lower end of each said hole interrupts the other of said opposed side means of its respective stake.

9. A system as set forth in claim 6 wherein said upper end means of said stake has a notched corner means at said one of said opposed side means that defines a notched surface means, said upper end of said hole interrupting said notched surface means.

10. A system as set forth in claim 9 wherein said notched surface means defines a shoulder against which said attaching end of said pin can abut.

11. A system as set forth in claim 10 wherein said notched surface means defines two substantially flat surfaces that are angled relative to each other and join together at a juncture line, one of said flat surfaces comprising said shoulder, said upper end of said hole interrupting said notched surface means at said juncture line thereof.

12. A system as set forth in claim 6 wherein each said rope has an upper end that is looped so as to define an opening therethrough, and means attaching said upper ends of said ropes to said tree.

13. A system as set forth in claim 12 wherein said means attaching said upper ends of said ropes to said tree comprises a tree collar means that is carried by said tree and extends through said openings of said upper ends of said ropes.

14. A system as set forth in claim 13 wherein said tree collar comprises a strip of flexible material that is wrapped about the trunk of said tree.

15. A system as set forth in claim 14 wherein said strip of material has one or more turns loosely wrapped about said trunk of said tree before being passed through said openings of said ropes to form a plurality of further loose wraps about said trunk of said tree.

16. In a method of making a stake for a tree comprising the steps of forming a piece of material to have an upper end means adapted to be operatively associated with an end of a support rope that is to be interconnected to said tree that is planted in the ground, forming said piece of material to have a lower end means adapted to be driven into said ground in spaced relation to said tree by hammering on said upper end means thereof, and forming said stake to have a pair of opposed side means and a centerline extending between said upper end means and said lower end means, the improvement comprising the steps of forming a substantially straight hole in said stake and leading from said upper end means at an angle to said centerline, and forming said hole to have an upper end that interrupts said upper end means adjacent one of said opposed side means whereby said hole is adapted to receive a substantially straight shank portion of an anchor pin through said upper end thereof until an attaching end of said pin for said end of said rope abuts said upper end means of said stake adjacent said upper end of said hole.

17. In a method of staking a tree comprising the steps of planting a tree in the ground, driving a plurality of stakes into said ground in a generally circular array about said tree, providing a plurality of rope means respectively having upper end means attached to said tree and lower end means attached to said stakes, forming each said stake to comprise a piece of material having an upper end means interconnected with said lower end means of its respective rope means and having a lower end means driven into said ground by hammering on said upper end means thereof, and forming each said stake to have a pair of opposed side means and a centerline extending between said upper end means thereof and said lower end means thereof, the improvement comprising the steps of forming a substantially straight hole in each said stake and leading from said upper end means thereof at an angle to said centerline thereof, forming each said rope means to comprise a rope having a lower end and an anchor pin having an attaching end attached to said lower end of its respective rope and having a substantially straight shank portion, and forming each said hole to have an upper end that interrupts said upper end means of its respective stake adjacent one of said opposed side means thereof and receiving said shank portion of its respective anchor pin therein until said attaching end abuts said upper end means of its respective stake adjacent said upper end of said hole.

18. A method as set forth in claim 17 and including the steps of forming each said rope to have an upper end that is looped so as to define an opening therethrough, forming means for attaching said upper ends of said ropes to said tree, forming said means for attaching said upper ends of said ropes to said tree to comprise a tree collar means that is carried by said tree and extends through said openings of said upper ends of said ropes, forming said tree collar to comprise a strip of flexible material that is wrapped about the trunk of said tree, and wrapping said strip of material one or more turns loosely about said trunk of said tree before passing said strip through said openings of said ropes to form a plurality of further loose wraps about said trunk of said tree.

* * * * *